Patented Aug. 10, 1954

2,686,158

UNITED STATES PATENT OFFICE 2,686,158

FLUORESCENT COATING COMPOSITION AND PROCESS EMPLOYING BORIC ACID

Shannon Jones, East Cleveland, Ohio, assignor to General Electric Company, a corporation of New York No Drawing. Application March 18, 1952, Serial No. 277,280

4 Claims. (Cl. 252—301.3)

My invention relates to compositions and processes for applying a coating of finely divided fluorescent materials or phosphors to the surfaces of glass supports such as the envelopes of fluorescent lamps.

It is an object of my invention to provide an improved composition and process for improving the adherence of phosphors to glass surfaces.

It has been proposed heretofore, see for example U. S. Patents 2,298,968, Roberts, and 2,344,081, Claude, to improve the adherence of phosphors to the walls of a glass envelope by the addition of boric acid to the conventional suspension of the fluorescent material in a binder comprising a cellulosic ester dissolved in a volatile solvent, the coating then being dried and subsequently fired to burn out the binder.

According to the present invention I provide an improved process having certain advantages over the processes employed heretofore. I obtain the improved results by substituting for the boric acid itself a hydrolyzable boric acid ester such as an alkyl borate like butyl, ethyl, or methyl borate, or phenyl borate, glycol borate, etc. These esters improve the adherence only after they have been hydrolyzed to give boric acid which is subsequently heated. If the esters in the suspension are allowed to evaporate naturally during the drying of the coating, a variable amount of hydrolysis will occur from atmospheric moisture, depending on the humidity and temperature of the air and other factors. It is therefore a further feature of my invention to improve the process by adding to the suspension a substantial amount of water. Inasmuch as the preferred solvents for the cellulosic binder are not substantially miscible with water, I add the water together with a material which is a good coupling agent between water and the organic solvent, in accordance with the disclosure of my co-pending application Serial No. 277,279 of even date. The addition of the water and coupling agent makes it possible to introduce a sufficient amount of water, say about one per cent by volume of the suspending medium, to assure hydrolysis of the borate. The water is also advantageous as a dispersing agent for the powdered phosphor as pointed out in greater detail in the aforesaid copending application. A preferred coupling agent is "Cellosolve" (mono-ethyl ether of ethylene glycol), although other coupling agents may be used as pointed out in the aforesaid co-pending application.

With sufficient water present in the binder, it is possible upon subsequent addition of the hydrolyzable boric acid ester to cause the hydrolysis to form enough boric acid (in a very fine and dispersed state) to be an effective adhesive upon lehring or firing of the coated envelope.

The improvement results from the extremely fine state of the hydrolyzed boric acid. Since the water is dissolved throughout the suspension, and hydrolysis occurs only where the water and alkyl borate react, the boric acid is distributed in a much finer state than can be obtained by grinding boric acid. This very fine state makes a small quantity of boric acid more effective in promoting adherence, without the bad effects on lehring and initial lumen output which occur when the larger quantities of milled boric acid which are required to give comparable adherence are used.

Tests on halophosphate phosphors, such as those disclosed in McKeag et al. Patent 2,488,733, and on a soft white mixture consisting of magnesium tungstate phosphor plus calcium silicate phosphor activated with lead and manganese, have shown both improved adherence and improved maintenance of initial efficiency due to this improved process. The lamp efficiencies with the hydrolyzed borate may, in some cases, be lower during the early part of the lamp life but higher during most of the lamp life. In order to obtain good coating adherence without appreciable loss in efficiency, I prefer to employ the borate in an amount sufficient to give about 0.1 to 0.7 per cent boric acid based on the weight of the phosphor.

A typical binder composition, herein designated as binder B, consists of about ½ per cent dynamite-grade nitrocellulose (W/V) dissolved in a mixture of 60 volume per cent butyl acetate and 40 volume per cent naphtha. (In the expression "W/V," W is the weight in grams, for instance, and V is volume in milliliters (or cubic centimeters), for instance.) The phosphor-to-binder ratio may be in the range of 1:1 to 1:2, and preferably about 1:1.5 (W/V) where the binder has a viscosity at 25° C. giving a flow between about 45 and 60 seconds through a Parlin #7 viscosity cup.

Examples of cellulosic binders which may be employed are nitrocellulose, cellulose acetate, ethyl cellulose, cellulose butyrate and mixed esters such as cellulose acetate butyrate. Examples of solvents therefor are naphtha plus butyl acetate, amyl acetate, nitropropane, methyl ethyl ketone and toluene plus alcohol.

As an example of a composition comprising my invention, binder B may be prepared by dissolving 25 pounds of alcohol-wet dynamite-grade nitrocellulose in a mixture of 200 gallons of naphtha and 300 gallons of butyl acetate. The viscosity is measured using a Parlin #7 cup, and if necessary a solution composed of 40 per cent naphtha and 60 per cent butyl acetate, by volume, is added until the viscosity measures 45 to 60 seconds at 25° C. This binder may then be mixed with the powdered phosphor to form a suspension having a phosphor-to-binder ratio of, for example, 1:1.5. To one kilogram of this suspension containing, for example, about 380 g. of phosphor, there is added 10.5 ml. of a mixture of Cellosolve and water (92 parts to 8 parts by volume), and this is mixed for 20 minutes. There is then further added 3.8 ml. of butyl borate followed by additional mixing for 5 minutes. (This gives about .23 per cent $H_3BO_3$ based on phosphor weight.) The suspension is then coated onto the inner surfaces of tubular glass envelopes which are subsequently dried and then fired in an oxidizing atmosphere at an elevated temperature of, for example, 525 to 610° C. for a time sufficient to burn out the binder and to fuse the boric acid which is formed by hydrolysis of the butyl borate.

Alternatively, the boric acid ester may be first mixed with substantially water-free binder or suspension, and the water and coupling agent subsequently added and mixed in.

What I claim as new and desire to secure by Letters Patent of the United States is:

1. A fluorescent coating composition comprising a suspension of finely divided phosphor particles in a lacquer comprising a cellulosic binder and a solvent therefor which is not substantially miscible with water and also containing about 0.1 to 0.7 per cent, by weight of the phosphor, of finely dispersed boric acid formed in situ by the incorporation therein of a hydrolyzable boric acid ester together with water in a small amount of about 1% by volume of the lacquer and sufficient to hydrolyze the boric acid ester and a coupling agent which is miscible with water and with said solvent.

2. A fluorescent coating composition comprising a suspension of finely divided phosphor particles in a lacquer comprising a cellulosic binder and a solvent therefor which is not substantially miscible with water and also containing about 0.1 to 0.7 per cent, by weight of the phosphor, of finely dispersed boric acid formed in situ by the incorporation therein of a hydrolyzable boric acid ester together with water in a small amount of about 1% by volume of the lacquer and sufficient to hydrolyze the boric acid ester and a coupling agent consisting of monoethyl ether of ethylene glycol which is miscible with water and with said solvent.

3. A fluorescent coating composition comprising a suspension of finely divided phosphor particles in a lacquer comprising a cellulosic binder and a solvent therefor which is not substantially miscible with water and also containing about 0.1 to 0.7 per cent, by weight of the phosphor, of finely dispersed boric acid formed in situ by the incorporation therein of an alkyl borate together with water in a small amount of about 1% by volume of the lacquer and sufficient to hydrolyze the alkyl borate and a coupling agent which is miscible with water and with said solvent.

4. A fluorescent coating composition comprising a suspension of finely divided phosphor particles in a lacquer comprising a nitrocellulose binder and a solvent therefor consisting of a mixture of butyl acetate and naphtha which is not substantially miscible with water and also containing about 0.1 to 0.7 per cent, by weight of the phosphor, of finely dispersed boric acid formed in situ by the incorporation therein of an alkyl borate together with water in a small amount of about 1% by volume of the lacquer and sufficient to hydrolyze the alkyl borate and a coupling agent consisting of monoethyl ether of ethylene glycol in an amount of about 92 parts thereof to 8 parts by water by volume.

References Cited in the file of this patent

UNITED STATES PATENTS

| Number | Name | Date |
|---|---|---|
| 2,058,844 | Vaughn | Oct. 27, 1936 |
| 2,298,968 | Roberts | Oct. 13, 1942 |
| 2,329,632 | Marsden | Sept. 14, 1943 |
| 2,344,081 | Claude | Mar. 14, 1944 |

FOREIGN PATENTS

| Number | Country | Date |
|---|---|---|
| 680,002 | Germany | July 27, 1939 |